June 4, 1963 K. GAUSLAA ETAL 3,092,603
METHOD OF CONTINUOUSLY COAGULATING RUBBER LATICES WITH
FRESH COAGULANT AND THE RESULTANT PRODUCT
Filed Dec. 30, 1958
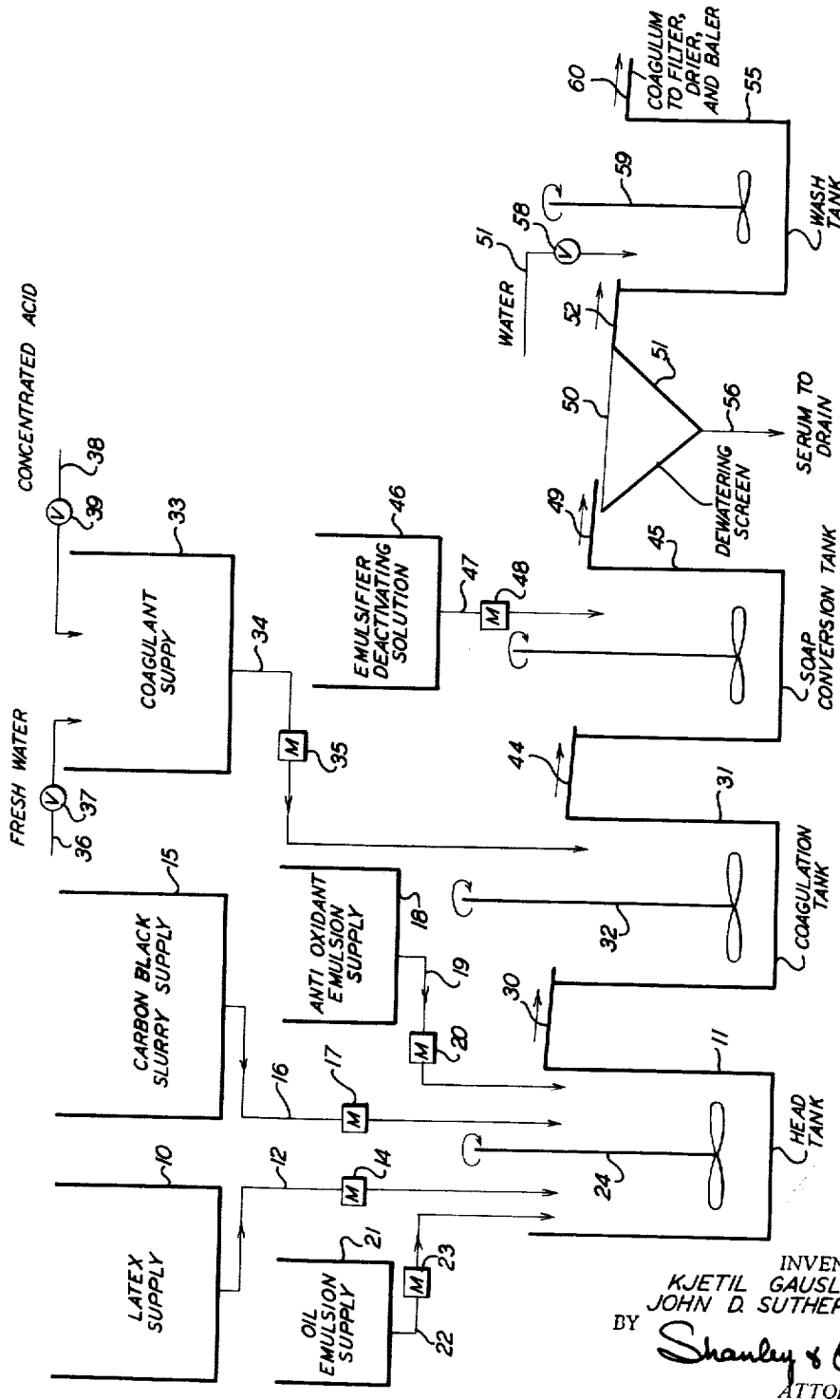
INVENTORS.
KJETIL GAUSLAA
JOHN D. SUTHERLAND, JR.
BY Shanley & O'Neil
ATTORNEY

United States Patent Office 3,092,603
Patented June 4, 1963

3,092,603
METHOD OF CONTINUOUSLY COAGULATING RUBBER LATICES WITH FRESH COAGULANT AND THE RESULTANT PRODUCT
Kjetil Gauslaa and John D. Sutherland, Jr., Baton Rouge, La., assignors to Copolymer Rubber and Chemical Corporation, a corporation of Louisiana
Filed Dec. 30, 1958, Ser. No. 783,803
18 Claims. (Cl. 260—33.6)

This invention relates to the preparation of rubbery polymers containing dispersed carbon black and, in some of its more specific aspects, the invention further relates to a method of preparing rubbery polymer black masterbatches or oil-black masterbatches whereby crumb size may be increased substantially over that obtainable by conventional methods of coagulation.

It has long been known that incorporation of colloidal carbons generally referred to in the art as carbon black with rubbery polymers imparts desirable properties in the ultimate product such as increased modulus, tensile strength and abrasion resistance. While carbon black is widely used as a reinforcing agent for rubbery polymers and is very satisfactory for this purpose once properly incorporated therewith, the prior art methods available heretofore for incorporating carbon black with rubbery polymers have left much to be desired.

The method most widely used at present for incorporating carbon black with rubbery polymers involves vigorous milling of dry pelletized carbon black into a solid rubbery polymer to be reinforced therewith over an extended period of time. The labor and power requirements for milling dry pelletized carbon black into solid rubbery polymers are excessive and also it is often difficult to obtain a uniform dispersion of sufficiently finely divided particles of carbon black. This tends to deleteriously affect the ultimate product since, for best results, it is essential that the carbon black be uniformly dispersed in finely divided form throughout the solid rubbery polymer. In addition, the working conditions are very undesirable since the light, dry particles of carbon black are extremely difficult to restrict to the working area and invariably the milling equipment and even the entire plant in the vicinity of the milling operation are soon covered with a sooty, black film of carbon black.

As a result of the above mentioned and other disadvantages of the prior art methods of milling dry carbon black into solid rubbery polymers, still other methods have been proposed for incorporating carbon black in rubbery polymers. One such method includes mixing an aqueous suspension of carbon black with rubbery polymers which are in the form of latex, and then coagulating the mixture of latex and aqueous suspension of carbon black to produce coagulum of the rubbery polymer having carbon black dispersed therein in finely divided form. This method, i.e. black masterbatching or oil-black masterbatching, requires that the carbon black be added to the latex in the form of an aqueous slurry with the carbon black being in an extremely finely divided condition. Since the aqueous slurry of wetted carbon black is easily handled and readily restricted to the working area and, upon coagulation of the mixture, the resulting coagulum already contains finely divided carbon black dispersed therein, the carbon black handling problem and extensive milling requirement characteristic of methods for incorporating dry pelletized carbon black with solid rubbery polymer are eliminated. However, when a mixture of latex and carbon black slurry, i.e., a carbex is coagulated by prior art practice to produce the desired rubbery polymer black masterbatch or oil-black masterbatch, the crumb size is extremely small with a prohibitive amount of fines being produced. Efforts to increase the crumb size, up until the time of the present invention, have not provided a method for the continuous coagulation of a carbex which is economic and generally acceptable to the industry.

The method presently used in the industry for coagulation of rubbery polymer latices is illustrated and discussed on pages 201–204 of the text "Synthetic Rubber," G. S. Whitby, editor-in-chief, John Wiley and Sons, Incorporated, New York. Upon reference to this text, it may be seen that pages 201–204 appear in chapter 7, which is entitled "The Manufacture of GR–S," and is concerned with the commercial method for the manufacture of GR–S on a commercial scale and in commercial quantities. Further, it may be seen that pages 201–204 relate to continuous "coagulation and drying" in such a commercial method for the manufacture of GR–S. In accordance with this method, serum from the dewatering screen is recycled back to the coagulation tank as the coagulant after adjustment of pH with concentrated acid. Thus, the concentrations of extraneous soluble constituents in the coagulant feed to the coagulation tank tend to build up and eventually the coagulant feed contains large amounts of water soluble substances such as salts which were present in the carbex feed, produced by chemical reactions taking place during coagulation, or added at some point in the system such as in a creaming step, the coagulation tank or soap conversion tank. For some reason, recycling serum back to the coagulation tank does not have an adverse effect upon coagulation of latex in the absence of carbon black. However, when a black masterbatch or an oil-black masterbatch is prepared by coagulating a carbex, the average crumb size produced under the same conditions as when coagulating latex alone is much smaller and a large proportion of undersized crumb and fines are produced. Further, the crumb size of masterbatches prepared in accordance with the prior art method could not be increased appreciably by adjustment of pH in the coagulation tank or by adjustment of other operating variables.

A large crumb size is very desirable in the physical processing of rubbery polymer coagulum since small crumb size material passes through filter screens employed for separating serum or wash water from coagulum and is lost in the plant effluent. Also, during drying of the crumb by means of conventional drier flights including perforated metal trays, a large proportion of the smaller particles and fines sift through the perforated trays and are lost in the drier. This allows fine particles of rubbery polymer to come into contact with the drier heating means and the rubbery polymer may be ignited and cause very serious drier fires which result in loss of product and extensive damage to equipment. Thus, it is essential that fines be removed from the drier at frequent intervals when processing fine crumb material and placed back in the drier trays by manual labor. This is a time consuming and expensive operation. As a result of the foregoing disadvantages, the art has long sought a satisfactory method for producing black masterbatches or oil-black masterbatches characterized by an increased crumb size that may be conveniently handled in presently used equipment.

In accordance with one important embodiment of the present invention, black masterbatches or oil-black masterbatches of rubbery polymers are prepared by a novel method which assures a substantial increase in crumb size over that obtainable by the conventional coagulation method. This may be conveniently accomplished by discarding the serum which heretofore has been recycled back to the coagulation tank, and then using only fresh coagulant containing substantially no recycled serum as the coagulant feed to the coagulation tank. Thus, when coagulating a carbex in accordance with the present invention, preferably soluble substances such as salts are not allowed to build up in the coagulation tank appreciably past their normal concentration in the carbex itself following addition of given amounts of fresh coagulant. Sodium or potassium salts which are produced upon addition of an acidic coagulant to the sodium or potassium soap-containing latex feed, emulsifier deactivating substances such as Polyamine H, alum or glue, various water soluble salts which are present in the polymerization recipe such as electrolytes, and creaming agents such as brine, all have been found to have a detrimental effect upon the crumb size of black masterbatches when the serum is recycled in the system.

It is surprising that the above mentioned substances, which are normally present without adverse effect in recycled serum to latex coagulation processes, have the very detrimental effect of decreasing crumb size in carbex coagulation processes. Nevertheless, this has been discovered to be true. For example, in the conventional method for the coagulation of latex, not only is serum recycled in the system as discussed above, but a creaming agent such as brine is added prior to the coagulation step. However, in accordance with one important embodiment of the present invention, it has been discovered that the latex may be creamed merely by addition of carbon black slurry and that brine solution or similar creaming agents are actually detrimental and should be omitted. Omitting the conventional creaming agent in addition to not recycling the serum in the system allows a further decrease in the concentration of salts present in the coagulation tank at the time of coagulating the carbex and it is possible to obtain an even larger crumb size.

It is an object of the present invention to provide a novel method of preparing rubbery polymers containing dispersed carbon black.

It is a further object of the present invention to provide a novel method of preparing oil extended rubbery polymers containing dispersed carbon black.

It is still a further object of the present invention to provide a novel method of coagulating a carbex whereby the crumb size of the resulting coagulum may be substantially increased over that obtainable by conventional coagulation methods.

It is a further object of the present invention to provide a novel rubbery polymer product containing dispersed carbon black which is prepared by coagulation of a carbex in accordance with the invention and characterized by an improved crumb size.

It is still a further object of the present invention to provide a novel method of coagulating a carbex, with or without addition of processing oil emulsion, whereby the loss due to fines may be substantially reduced.

It is still a further object of the present invention to provide a novel oil-extended rubbery polymer product containing dispersed carbon black which is prepared by coagulation, in accordance with the invention, of a carbex containing oil emulsion and charcterized by an improved crumb size.

It is still a further object of the present invention to provide a novel continuous method for coagulating a carbex whereby rubbery polymer crumb is obtained having a substantially larger particle size than may be produced by prior art methods.

Still other objects of the present invention and the attendant advantages thereof will be apparent to those skilled in the art upon reference to the following detailed description, the specific example, and the drawing, which illustrates one suitable arrangement of apparatus for practicing the method of the present invention.

Referring now to the drawing, rubbery polymer latex contained in latex supply tank 10 is fed to head tank 11 via conduit 12 at a predetermined desired rate controlled by meter 14. Simultaneously, carbon black slurry in tank 15 is fed to head tank 11 via conduit 16 at a predetermined desired rate controlled by meter 17, while anti-oxidant emulsion contained in tank 18 may be fed to head tank 11 via conduit 19 at a predetermined desired rate controlled by meter 20. Also, in instances where an oil extended black masterbatch is being prepared, oil emulsion contained in tank 21 may be fed to head tank 11 via conduit 22 at a predetermined rate controlled by meter 23. The contents of head tank 11 are agitated by agitation means including driven stirrer 24 so as to provide a homogeneous mixture or carbex. The relative feed rates of latex, carbon black slurry, anti-oxidant emulsion, and oil emulsion are adjusted so as to provide a carbex composition in head tank 11, which, upon coagulation, will produce a black masterbatch or oil-black masterbatch of the rubbery polymer containing desired amounts of the ingredients.

Preferably, each of the ingredients in tanks 10, 15, 18 and 21 are added continuously to head tank 11 to form a carbex of predetermined composition which overflows spout 30 into coagulation tank 31. While the invention is not limited thereto, the black masterbatch carbex continuously overflowing spout 30 may be formed by adding continuously to head tank 11 1–200 gallons per minute of a conventional 1–10% (by weight) high abrasion furnace black slurry in water, 1–100 gallons per minute of a 5–40% TSC (by weight) rubbery polymer latex such as butadiene-styrene latex prepared by a conventional "cold rubber" polymerization recipe and process, 0–20 gallons gallons per minute of a 20–70% (by weight) conventional rubbery polymer processing oil emulsion, and 0.1–10 pounds per minute of a 5–25% (by weight) conventional rubbery polymer anti-oxidant emulsion such as "BLE" or phenyl-B-naphthylamine. The above carbex is given by way of example only, and it is understood that any suitable prior art carbex may be coagulated in accordance with the principles of the present invention.

The carbex passed to coagulation tank 31 is agitated by agitation means including driven stirrer 32 and coagulant continuously added thereto from coagulant tank 33 via conduit 34 at a predetermined rate controlled by meter 35. The coagulant for most commercial processes is an aqueous solution of a mineral acid such as sulfuric acid, hydrochloric acid, or phosphoric acid, of which generally an aqueous solution of sulfuric acid is preferred, but other suitable coagulants may be used. For example, fresh organic acid coagulants such as acetic acid may be used. In accordance with the present invention, the coagulant fed to coagulation tank 31 must not be serum which has been recycled from the de-watering apparatus to be described hereinafter back to the coagulation tank 31 after addition of concentrated coagulant. For example, when the coagulant is dilute acid, it may be prepared by feeding fresh water into coagulant tank 33 via conduit 36 at a rate controlled by valve 37 while concentrated acid is fed thereto via conduit 38 at a rate controlled by valve 39. The relative feed rates of fresh water and concentrated acid may be controlled so as to provide a solution having the desired pH. When the coagulant is prepared in this manner, detrimental substances are not introduced into coagulation tank 31 along with the coagulant which would be true if serum were substituted for the fresh water feed.

The amount of coagulant added to coagulation tank 31 need not differ from prior art practice. For example, when mineral acid is the coagulant, the acid solution in coagulant tank 33 may have a pH of about 1.0–2.5 but preferably a pH of about 1.7 and it may be added to coagulation tank 31 at a rate sufficient to maintain a pH therein between about 1.5–5.0 but preferably at a pH of about 3.0. The temperature of the coagulation mixture in coagulation tank 31 likewise need not differ from prior art practice. For example, the temperature of the coagulation mixture may be maintained at about 110–210° F., but preferably at about 140° F. for best results in most instances. Similarly, the carbex feed to the coagulation tank need not differ from prior art practice and any prior art carbex containing rubbery polymer latex and carbon black slurry, with or without anti-oxidant emulsion and/or oil emulsion, may be coagulated with improved results in accordance with the present invention. The preferred anti-oxidant is an emulsion of "BLE" in water using a sodium or potassium long chain fatty acid soap such as potassium oleate as the emulsifying agent. BLE is a proprietary product that is said to be the high temperature reaction product of di-phenylamine and acetone which may be in the form of a dark-brown viscous liquid and characterized by a specific gravity of 1.087, solubility in acetone, benzol and ethylene dichloride and insolubility in gasoline and water.

The coagulation which occurs in coagulation tank 31 is often not complete and the mixture overflowing spout 44 appears as black crumbs of rubbery polymer in a white, milky serum. For the purpose of clearing up the serum and obtaining substantially complete coagulation, a secondary emulsifier deactivating solution contained in tank 46, is passed to soap conversion tank 45 via conduit 47 at a rate controlled by meter 48. The present invention allows a wide choice of substances suitable for deactivating the secondary emulsifier usually present in synthetic rubber polymerization recipes. For example, the secondary emulsifier deactivator may be an aqueous solution of Polyamine H, which is said to be still bottoms obtained in the preparation of diethylene triamine and various other amine compounds or alum, glue, and other suitable prior art materials useful for this purpose. The addition of substances such as recycled serum or salts at this point in the coagulation process is not detrimental since the crumb size has already been established. However, it is essential that substantial amounts of recycled serum or salts not be added to the coagulation tank itself or the previously discussed detrimental results will be observed and a coagulum characterized by substantially reduced crumb size will be formed in coagulation tank 31. The preferred secondary emulsifier deactivator is about 0.1-50% (by weight) aqueous Polyamine H solution which may be added to the material flowing through soap conversion tank 45 at a rate of about 1-10 gallons per minute. However, the best method of control is visual observation with the emulsifier deactivating solution being added in quantities sufficient to give a serum which is substantially clear, thereby indicating essentially complete coagulation of the latex. Since the serum is not recycled in the system, any quantity of a suitable substance which normally would be detrimental to the coagulation process may be added to the soap conversion tank 45, or at any point past coagulation tank 31.

A mixture comprising coagulum containing carbon black uniformly dispersed therein and substantially clear serum overflow spout 49 onto de-watering screen 50. The serum is separated from the coagulum and passed downwardly into vessel 51, while the coagulum passes across screen 50 and spout 52 into wash tank 55. In accordance with conventional prior art practice, the serum which is withdrawn from vessel 51 via conduit 56 is recycled to coagulant supply tank 33 and concentrated acid added thereto for the purpose of adjusting the pH to a desired level. However, in accordance with the present invention, it is essential that serum not be recycled and thus it is usually discarded as waste. In any event, the serum must not be recycled back to coagulation tank 31 or to a point in the system ahead of coagulation tank 31, as a substantially reduced crumb size invariably results.

The resulting coagulum, which is in the form of crumb characterized by an increased crumb size over that obtainable by conventional carbex coagulation processes, is washed in wash tank 55 with water added via conduit 57 at a rate controlled by valve 58 to remove free acid and soluble salts. The mixture of coagulant and wash water is agitated by agitation means including driven stirrer 59. The wash water and washed coagulum overflows spout 60 and is passed to conventional prior art filters for the purpose of separating wash water from the coagulum. The coagulum is then passed to prior art driers, dried, and the dried rubber baled for shipment.

When coagulating a carbex in accordance with the present invention, it is not necessary to cream the carbex prior to coagulation by addition of a creaming agent such as brine. It has been found that the carbon black slurry itself will perform this function. In addition, a creaming agent such as brine or other salts should not be added at any point in the system adhead of the coagulation tank since, in many instances, this tends to reduce the crumb size. Thus, for best results the carbex is coagulated in the presence of only the salts normally present in the latex carbon black slurry, oil emulsion and anti-oxidant emulsion.

In accordance with prior art practice, it is necessary to recycle serum in the system in order to provide sufficient liquid for an agitatable mass in each of the tanks following the head tank 11, and also to provide sufficient liquid to physically transport the crumb from one tank to the next along the coagulation chain. However, in accordance with the present invention, the carbon black slurry which is fed to head tank 11 contains sufficient water when combined with the serum of the latex, to provide the necessary liquid to float the coagulum along through the vessels of the coagulation chain. It is not necessary to add a greater volume of coagulant to the coagulation tank than is necessary to effect coagulation. Preferably, however, the coagulant is relatively dilute in order to provide a sufficient volume to assure thorough mixing with the contents of the coagulation tank 31.

The coagulation of a carbex in accordance with the method of the present invention is capable of improving crumb size substantially in continuous operation on a commercial scale. When compared with products prepared by prior art methods for coagulating a carbex where serum is recycled in the system, with other conditions being identical, the product produced in accordance with the present invention when serum is not recycled is characterized by a substantially larger particle size in every instance.

While an essentially continuous over-all method is illustrated in the drawings and specifically described herein, it is also possible to perform one or more of the various steps of the continuous method on a batch basis such as, for example, preparation of the carbex, clarifying the serum by addition of a secondary emulsifier deactivator, de-watering of the coagulum-serum mixture, washing of the coagulum, etc. Still other modifications of the method of the invention other than those specifically set forth above are possible without departing from the invention and will be apparent to those skilled in the art.

The rubbery polymer latex for use in practicing the present invention may be either natural rubber latex or synthetic rubber latex. The synthetic rubber latices useful in preparing the carbex may be produced by prior art processes well known in the art such as, for example, by known processes wherein a polymerizable monomeric material or a mixture of polymerizable materials is emulsified in an aqueous medium by means of an emulsifying agent such as a soap or other suitable surface active agent, and the polymerization made to take place at a controlled temperature in the presence of a suitable catalyst and/or other regulating materials. The primary emulsifier preferably should be unstable at low pH and may be a long chain fatty acid soap such as sodium or potassium oleate or stearate, the rosin soaps, or mixtures thereof. The polymerization is generally "short-stopped" at a suitable stage before complete conversion, such as at about 60% conversion, and the unreacted monomer or monomers removed by conventional flashing and/or stripping. As is well understood in the art, it is also advantageous in the preparation of certain synthetic rubber latices, such as SBR latices, to carry out the polymerization at a low temperature such as about 41° F. However, the polymerization may take place at a high temperature such as about 122°

F. when preparing SBR latices by a prior art "hot rubber" process.

Examples of polymerizable materials for use in preparing the synthetic rubber latices are the various 1,3-butadienes such as 1,3-butadiene, methyl-2-butadiene-1,3-piperylene, and 2,3-dimethyl-butadiene-1,3. If desired, the polymerizable material may be a mixture of a 1,3-butadiene, such as 1,3-butadiene, with another polymerizable compound which is capable of forming rubbery copolymers with 1,3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1,3-butadienes are the aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. The foregoing polymerizable substances or mixtures are examples of materials that may be used in preparing rubbery polymer latices for use in the present invention which may be referred to in the specification and claim as latices of homo-polymers of conjugated diolefins and latices of copolymers of conjugated diolefins and ethylenically unsaturated monomers. In addition, natural rubber latex and polychloroprene latex may be used. The preferred polymerizable material for preparing a latex for use herein is a mixture of butadiene and styrene wherein the styrene content of the mixture, by weight, is less than about 50%. A typical recipe in parts by weight for preparing a butadiene-styrene synthetic rubber latex by a "cold rubber" process is given below in Table I.

TABLE I

| | |
|---|---|
| Butadiene | 100-50 |
| Styrene | 0-50 |
| Primary emulsifier[1] | 1.5-5.0 |
| Electrolyte[2] | 0.2-1.5 |
| Secondary emulsifier[3] | 0-0.12 |
| Ethylenediamine tetraacetic acid tetra sodium salt[4] (in soap solution) | 0-0.10 |
| Sodium hydrosulfite | 0-0.10 |
| Water | 150-250 |
| Sodium formaldehyde sulfoxylate | 0.04-0.20 |
| Diisopropylbenzene hydroperoxide or paramenthane hydroperoxide | 0.03-0.30 |
| Tertiarydodecylmercaptan | 0-0.3 |
| Ferrous sulfate heptahydrate | 0.02-0.04 |
| Versene 100 to complex ferrous sulfate | 0.03-0.06 |
| Shortstop[5] | 0.05-0.20 |

[1] The primary emulsifier may be a long chain fatty acid soap such as sodium or potassium oleate or stearate, the rosin soaps, or mixtures thereof.
[2] The following electrolytes or mixtures may be used: Potassium chloride, sodium chloride, trisodium phosphate, tripotassium phosphate, potassium pyrophosphate, potassium sulfate, sodium sulfate, sodium borate and lithium chloride. The preferred electrolyte is 0.3 part by weight of trisodium phosphate.
[3] Tamol N, Daxad 11, Nycol (polymerized sodium salts of alkyl naphthalene sulfonic acid).
[4] Sold as Versene 100, a product of Dow Chemical Company; Sequestrene 30A, a product of Alrose Chemical Company; Nullapon BF-13, a product of Antara Chemicals.
[5] A 50/50 mixture of sodium dimethyl dithiocarbamate and sodium polysulfide.

The preparation of carbon black slurries is well known in th art. For example, pelletized high abrasion furnace black may be finely ground by a mechanical pulverizer such as a Mikro-Pulverizer and the dry carbon black dropped into an aqueous solution of a wetting agent of soap such as potassium oleate or stearate with agitation. The oil emulsion and the anti-oxide emulsion may be prepared by any suitable process such as by violently agitating the oil or anti-oxidant in a blender with an aqueous solution of wetting agent or soap such as potassium oleate or stearate. Any suitable rubber processing oil may be used in preparing the oil emulsion. While numerous suitable rubber processing oils are known to the art, several examples are described by Rostler et al., "Industrial and Engineering Chemistry," vol. 41, No. 3 (March 1949), pages 598-608; and Weinstock et al., "Industrial and Engineering Chemistry," vol 45, No. 5 (May 1953), pages 1036-1053. Other suitable rubbery polymer processing oils are rubber processing oils of the paraffinic, aromatic, highly aromatic, naphthenic, and highly napthenic types. These oils are usually of petroleum origin.

The foregoing detailed description and the following specific example are for purposes of illustration only, and are not intended as limiting to the spirit or scope of the appended claims.

*Example*

A black masterbatch carbex was prepared by continuously mixing in a head tank 6% by weight solids high abrasion furnace black slurry at the rate of 60 gallons per minute, 20% TSC (by weight) butadiene-styrene latex prepared by a conventional "cold rubber" polymerization process using the recipe of Table I at the rate of 34.5 gallons per minute, and 4.8 pounds per minute of a 15% by weight anti-oxidant emulsion of BLE. The contents of the head tank were agitated and the resultant homogeneous mixture or carbex was continuously overflowed to a coagulation tank at the rate of introduction of the various ingredients into the head tank. A fresh sulfuric acid solution free of serum, having a pH of 1.7 and prepared by diluting concentrated sulfuric acid (98%) with fresh water was added continuously to the contents of the coagulation tank, with agitation, at a rate sufficient to provide a pH of about 3.0. This required a feed rate of about 30 gallons of sulfuric acid solution per minute, but the feed rate varies somewhat under control of a continuous pH recording instrument. The temperature of the contents of the coagulation tank was maintained at about 140° F.

The crumb which formed in the coagulation tank and a milky appearing serum was continuously overflowed from the coagulation tank at the rate of feed of the various ingredients into a soap conversion tank where a 1% by weight Polyamine H solution was added continuously, with agitation, at a rate of about 4 gallons per minute. This quantity of Polyamine H solution was sufficient to clear the serum in most instances, but where cloudiness remained additional Polyamine H solution was added so as to clear the serum. The crumb and clear serum were overflowed continuously from the soap conversion tank at the rate of feed of the various ingredients, and passed to a de-watering screen where the mixture was filtered and the crumb separated from the serum. The serum was discarded and the crumb passed continuously to a wash tank.

After thorough washing with agitation in the wash tank for the purpose of removing residual sulfuric acid and soluble salts, the crumb was continuously overflowed from the wash tank together with the wash water and passed to a continuous suction filter. After filtering, the crumb was placed on perforated trays in a conventional three-pass drier, dried for about two hours at 180-190° F., and then baled in about 90 pound quantities for shipping.

The above process was carried out continuously over an extended period of time and the crumb produced was characterized by a substantially larger size than produced under identical conditions with the exception of recycling serum in the system. For example, when attempts were made to recycle serum back to the coagulation tank, after addition of concentrated sulfuric acid to adjust the pH to 1.7 and with all other conditions being the same, a substantially smaller crumb size and an excessive proportion of undersized crumb or fines were formed in every instance.

It was not necessary to add a creaming agent such as brine ahead of the coagulation tank. In fact, when brine was added ahead of the coagulation tank to cream the latex, this practice resulted in the formation of a noticeably smaller crumb and was abandoned. Thus, for best results, salts such as brine (NaCl solution) should not be added ahead of the coagulation tank or to the coagulation tank.

An oil-black masterbatch was prepared by modifying the procedure outlined above by continuously adding 1.26 gallons per minute of 55% (by weight) rubber processing oil emulsion to the head tank along with the latex, carbon black slurry, and anti-oxidant emulsion in the quantities mentioned above. Upon coagulation, an oil-extended butadiene-styrene rubber was obtained containing carbon black uniformly dispersed therethrough. The crumb size was substantially larger than that obtainable when serum was recycled in the system. For example, when attempts were made to recycle serum back to the coagulation tank, after adjustment of pH to 1.7 with concentrated sulfuric acid and all other conditions being the same, a substantially smaller crumb size was produced and the practice had to be abandoned. Also, when brine was added ahead or to the coagulation tank, a substantially smaller crumb size material was produced.

What is claimed is:

1. In a method of continuously preparing rubbery polymers containing dispersed carbon black wherein a rubbery polymer while in the form of latex is mixed with an aqueous suspension of carbon black and the resultant mixture coagulated, the improvement comprising the steps of coagulating the mixture of latex and aqueous suspension of carbon black by addition of fresh coagulant substantially free of recycled serum to produce coagulum of the rubbery polymer containing carbon black dispersed therein, and separating the resultant coagulum from the serum, the mixture of latex and aqueous suspension of carbon black being coagulated continuously in a continuous commercial scale operation and the rubbery polymer being selected from the group consisting of natural rubber, polychloroprene, homo-polymers of conjugated diolefins, copolymers of conjugated diolefins and mono ethylenically unsaturated monomers copolymerizable therewith, and mixtures thereof.

2. The method of claim 1 wherein the coagulant consists essentially of an aqueous solution of mineral acid.

3. The method of claim 1 wherein the coagulant consists essentially of an aqueous solution of sulfuric acid and the rubbery polymer consists essentially of a ocpolymer of butadiene and styrene.

4. The method of claim 1 wherein the rubbery polymer is a copolymer of butadiene and styrene.

5. In a method of continuously preparing rubbery polymers containing dispersed carbon black wherein a rubbery polymer while in the form of latex is mixed with an aqueous suspension of carbon black and the resultant mixture coagulated, the improvement comprising the steps of continuously coagulating the mixture of latex and aqueous suspension of carbon black by continuous addition of fresh coagulant substantially free of recycled serum to produce coagulum of the rubbery polymer containing carbon black dispersed therein, and continuously separating the resultant coagulum from the serum, the mixture of latex and aqueous suspension of carbon black being coagulated continuously in a continuous commercial scale operation and the rubbery polymer being selected from the group consisting of natural rubber, polychloroprene, homo-polymers of conjugated diolefins, copolymers of conjugated diolefins and mono ethylenically unsaturated monomers copolymerizable therewith, and mixtures thereof.

6. The method of claim 5 wherein the rubbery polymer is a copolymer of butadiene and styrene.

7. The method of claim 5 wherein the coagulant consists essentially of an aqueous solution of mineral acid.

8. The method of claim 6 wherein the coagulant consists essentially of an aqueous solution of sulfuric acid.

9. In a method of continuously preparing oil-extended rubbery polymers containing dispersed carbon black wherein a rubbery polymer while in the form of latex is mixed with an emulsion of rubbery polymer processing oil and an aqueous suspension of carbon black and the resultant mixture coagulated, the improvement comprising the steps of coagulating the mixture of latex, oil emulsion and aqueous suspension of carbon black by addition of fresh coagulant substantially free of recycled serum to produce oil extended coagulum of the rubbery polymer containing carbon black dispersed therein, and separating the resultant coagulum from the serum, the mixture of latex, oil emulsion and aqueous suspension of carbon black being coagulated continuously in a continuous commercial scale operation and the rubbery polymer being selected from the group consisting of natural rubber, polychloroprene, homo-polymers of conjugated diolefins, copolymers of conjugated diolefins and mono ethylenically unsaturated monomers copolymerizable therewith, and mixtures thereof.

10. The method of claim 9 wherein the rubbery polymer is a copolymer of butadiene and styrene.

11. The method of claim 9 wherein the coagulant consists essentially of an aqueous solution of mineral acid.

12. The method of claim 10 wherein the coagulant consists essentially of an aqueous solution of sulfuric acid.

13. In a method of continuously preparing oil-extended rubbery polymers containing dispersed carbon black wherein a rubbery polymer while in the form of latex is mixed with an emulsion of rubbery polymer processing oil and an aqueous supsension of carbon black and the resultant mixture coagulated, the improvement comprising the steps of continuously coagulating the mixture of latex, oil emulsion and aqueous suspension of carbon black of continuous addition of fresh coagulant substantially free of recycled serum to produce oil-extended coagulum of the rubbery polymer containing carbon black dispersed therein, and continuously separating the resultant coagulum from the serum, the mixture of latex, oil emulsion and aqueous suspension of carbon black being coagulated continuously in a continuous commercial scale operation and the rubbery polymer being selected from the group consisting of natural rubber, polychloroprene, homo-polymers of conjugated diolefins, copolymers of conjugated diolefins and mono ethylenically unsaturated monomers copolymerizable therewith, and mixtures thereof.

14. The method of claim 13 wherein the coagulant consists essentially of an aqueous solution of mineral acid.

15. The method of claim 13 wherein the coagulant consists essentially of an aqueous solution of sulfuric acid and the rubbery polymer consists essentially of a ocpolymer of butadiene and styrene.

16. The method of claim 13 wherein the rubbery polymer is a copolymer of butadiene and styrene.

17. The rubbery polymer containing dispersed carbon black prepared by the method of claim 1.

18. The oil-extended copolymer of butadiene and styrene containing dispersed carbon black prepared by the method of claim 10.

References Cited in the file of this patent

UNITED STATES PATENTS

| | | |
|---|---|---|
| 2,527,525 | Breuer | Oct. 31, 1950 |
| 2,576,909 | Adams | Dec. 4, 1951 |
| 2,769,795 | Braendle | Nov. 6, 1956 |

OTHER REFERENCES

Adams et al., "Industrial & Engineering Chemistry," March 1951, volume 43, No. 3, page 763.

"The Rubber Age and Synthetics," volume 32, No. 6, August 1951, pages 197, 198 and 200.

UNITED STATES PATENT OFFICE
CERTIFICATE OF CORRECTION

Patent No. 3,092,603

June 4, 1963

Kjetil Gauslaa et al.

It is hereby certified that error appears in the above numbered patent requiring correction and that the said Letters Patent should read as corrected below.

Column 3, line 58, for "charcterized" read -- characterized --; column 6, line 10, for "adhead" read -- ahead --; column 7, line 27, for "claim" read -- claims --; line 72, for "antioxide" read -- anti-oxidant --; column 9, lines 49 and 50, for "ocpolymer" read -- copolymer --; column 10, line 36, for "of", second occurrence, read -- by --; lines 54 and 55, for "ocpolymer" read -- copolymer --.

Signed and sealed this 10th day of December 1963.

(SEAL)
Attest:
ERNEST W. SWIDER

Attesting Officer

EDWIN L. REYNOLDS

Acting Commissioner of Patents